July 10, 1934. C. C. STRAWN 1,965,912
IRRIGATION SPRINKLER
Filed Nov. 25, 1932
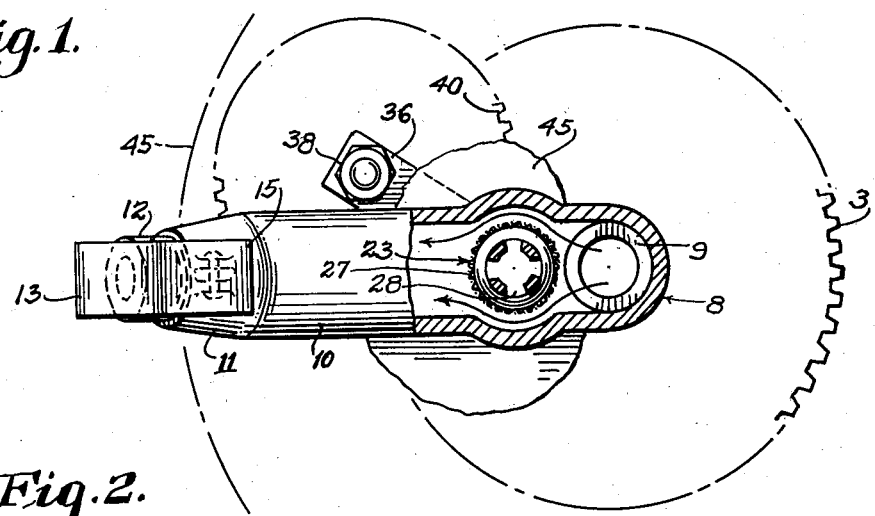
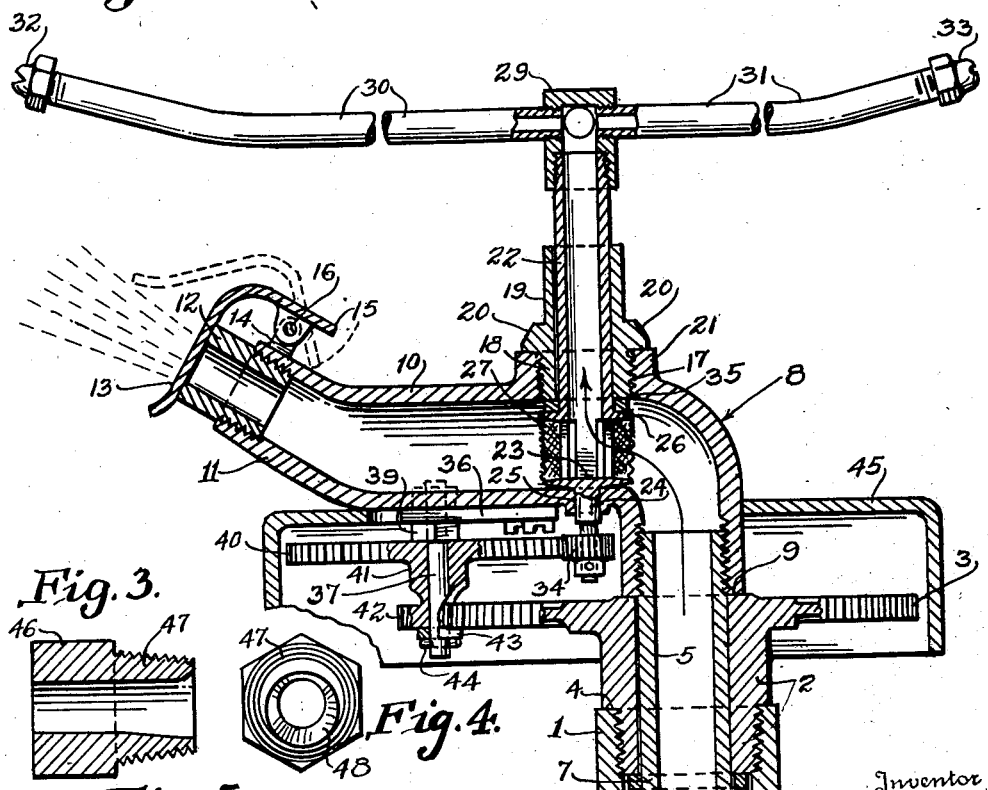
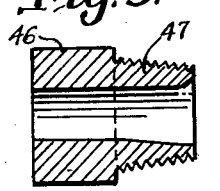
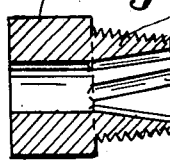
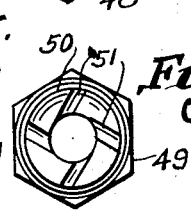
Inventor
CHESTER C. STRAWN
By Mason Fenwick Lawrence
Attorneys Patented July 10, 1934

1,965,912

UNITED STATES PATENT OFFICE 1,965,912

IRRIGATION SPRINKLER

Chester C. Strawn, De Land, Fla.

Application November 25, 1932, Serial No. 644,376

6 Claims. (Cl. 299—69)

The invention forming the subject matter of this application is an irrigation sprinkler, peculiarly adapted for use in citrus groves, or golf courses, or large lawns.

As well known in this art, it is necessary in order to obtain the maximum range of a sprinkler nozzle, that it be revolved very slowly in order to avoid a whipping action which would reduce the throw of the water and consequently reduce the area irrigated by the sprinkler.

The basic idea or fundamental principle of the present invention is to provide a sprinkler of simple construction having a main nozzle very slowly rotated on a fixed pivot, energy being derived from secondary rotating nozzles having two or more jets set at such an angle as to develop sufficient power to rotate itself—by recoil of water pressure—and to supply energy to the main nozzle and body of the sprinkler by reduction gears arranged as a compound spur gear set, thus making possible a slow and steady rotation of the main nozzle which gives an even distribution of large quantities of water throughout the entire circle.

The main object of the invention is to provide a sprinkler of the character described in which the main nozzle has a rotating filter inserted in the path of flow of the main water supply so as to filter the water flowing to and through the comparatively fine nipples of the secondary nozzles. By this construction, the finer jets of the secondary nozzles are prevented from becoming clogged by grass, flakes of rust or other foreign matter, which may be carried along in the main irrigating stream, without restricting flow of water passing through the main nozzle. At the same time the rotating filter is cleaned by the rush of water under pressure to and through the main nozzle.

Another object of the invention is to provide the end of the main nozzle with an automatically operated cover which protects the main jet from stoppage during idle periods by nesting insects, or by other obstructions. Its action is entirely automatic since it lifts and rides on the water stream during service period and falls by gravity as water is shut off, closing the main jet.

A further object of the invention is to provide the gearing of devices of this character with a casing to prevent the clogging of the gears during idle periods by roosting birds or by dirt.

Other objects of the invention will become apparent as the detailed description thereof proceeds.

In the drawing:

Figure 1 is a plan view of the sprinkler embodying this invention, parts thereof being broken away and shown in section to illustrate details of construction;

Figure 2 is a central vertical section through the sprinkler;

Figure 3 is a vertical section through one form of jet adapted to be applied to the main nozzle;

Figure 4 is an end elevation of the jet illustrated in Figure 3;

Figure 5 is a vertical section of another form of jet adapted to be detachably mounted on the main nozzle; and Figure 6 is an end elevation of the jet illustrated in Figure 5.

As shown in the drawing, the sprinkler comprises a substantially vertical base member 1 adapted to be connected to any suitable source of water under pressure. The member 1 is internally screwthreaded at its upper end to receive the externally screwthreaded end of a hub 2 extending downwardly from a large spur gear 3. The hub 2 is provided with a shoulder 4 adapted to contact with the upper end of the base member 1 to lock the gear 3 against rotation relative to the base member 1. The hub 2 is centrally bored to act as a sleeve for a cylindrical pivot 5 provided at its lower end with an outwardly directed flange 6. A washer 7 is interposed between the flange 6 and the inwardly projecting end of the hub 2.

The cylindrical pivot 5 is externally screwthreaded at its upper end to receive the internally threaded lower end of a substantially L-shaped nozzle designated generally by the reference character 8. The co-operating screwthreads on the upper end of the pivot 5 and the lower end of the nozzle 8 are constructed so that the lower end 9 of the nozzle 8 just barely contacts with the upper end of the hub 2 of the spur gear 3. It is essential, of course, that the lower end 9 of the nozzle 8 shall not impose any clamping pressure on the hub 2, as it is intended that the nozzle 8 and the cylindrical pivot 5 will rotate bodily about the axis of the pivot 5, with as little friction as possible, under the compartively small force resulting from the arrangement of secondary nozzles to be described hereafter. It will be understood, of course, that the cooperating screwthreads on the various members will be directionally arranged so that they will not become disengaged by the rotation of the several parts under the force applied thereto.

The main nozzle 8 includes a horizontal branch 10 having a slightly upturned end 11 which is externally screwthreaded to receive detachably a jet 12 having one end thereof threaded into the upturned end 11. A flap valve 13 is rotatably mounted on a bracket 14 extending from the upper side of the upturned end 11. The valve 13 is substantially L-shaped and has a part 15 thereof projecting rearwardly of the pivot 16, connecting the flap valve to the bracket 14, sufficiently far to contact with the upper side of the end 11 as to prevent the flap valve falling over rearwardly by gravity or by the impact of water rushing through the jet 12 when the device is in operation. The idea of this flap valve construction is to insure that the jet 12 shall always be closed by gravity when the sprinkler is out of operation, thereby preventing closure of the jet 12 by nesting birds or other objects.

In order to rotate the main nozzle 10 slowly about the axis of the cylindrical pivot 5, the horizontal branch 10 of the main nozzle is provided with an internally screwthreaded aperture 17 adapted to receive the externally screwthreaded end 18 of a cylindrical nut 19 provided between its ends with a flange 20 adapted to contact with the upper end of a boss 21 formed on the horizontal branch 10 and continuing the aperture 17. The cylindrical nut 19 operates as a sleeve in which a hollow shaft 22 is rotatably mounted. The shaft 22 is provided at its lower end with an outwardly turned flange 23, the lower face of which has a pivot lug 24 projecting downwardly therefrom to rotate in an aperture 25 formed in the lower side of the horizontal branch 10. A second flange 26 is formed outwardly of the shaft 22 at a distance from the flange 23 slightly less than the diameter of the horizontal branch 10. The two flanges are substantially the same in diameter and are designed to have a cylindrical screen 27 suitably secured to their peripheries, as by soldering.

The shaft 22 between the said flanges 23 and 26 is suitably bored or slotted to provide passages 28 for water forced through the screens from the main stream flowing through the main nozzle. The shaft 22 at its upper end is externally screwthreaded to receive the lower end of a T-fitting 29. This T-fitting is provided with internally screwthreaded apertures adapted to receive the externally screwthreaded ends of the secondary nozzles 30 and 31. Only two of these nozzles appear in the drawing, but it is to be understood that any number of such nozzles may be secured to a suitably constructed fitting adapted to be detachably secured to the upper end of the shaft 22.

The outer ends of the secondary nozzles 30 and 31 are bent in opposite directions in a manner well known in this art to effect rotation of the shaft 22 by the reaction of water under pressure emerging through the small jets 32 and 33, detachably secured to the ends of the nozzles 30 and 31, respectively. There is no particular novelty involved in the construction of the secondary nozzles or the jets thereon, as any of the well known forms of these nozzles and jets can be used for this purpose.

The pivot lug 24 extending downwardly from the closed lower end of the shaft 22 is reduced to receive a pinion 34 which is suitably pinned or keyed to this reduced portion to rotate along with the cylindrical shaft 22. A washer 35 of fibre, or other suitable material, is interposed between the upper face of the flange 26 and the lower end of the cylindrical nut 19 to hold the shaft 22 and the screened cage formed by the slots 28 rotatable in the horizontal branch with as little friction as possible; and to maintain the pinion 34 properly positioned below said branch 10.

A bracket 36 is suitably secured to the lower side of the horizontal branch 10; and the outer end of this bracket has a pivot pin 37 depending therefrom and suitably secured thereto as by the lock nuts 38 and 39. The pivot pin 37 has rotatably mounted thereon a large spur gear 40, the teeth of which mesh with the teeth of pinion 34. A hub 41 extends downwardly from the center of the spur gear 40 and has a pinion 42 formed integrally thereon or suitably secured thereto. A washer 43 held rotatably on the pin 37 by a cotter pin 44 is used to hold the gears 40 and 42 in their proper position on the pivot pin 37 so as to insure their being in constant mesh with the pinion 34 and the spur gear 3, respectively. A hood 45 is suitably secured to the main nozzle to protect the gearing referred to and prevent fouling thereof.

As will be apparent from Figure 1 of the drawing, the horizontal branch 10 of the main nozzle is somewhat enlarged around the center of the cylindrical shaft 22. The purpose of this enlargement, of course, is to provide a free passageway for the greater part of the water under pressure around the screen 27. It will be evident from inspection of Figures 1 and 2 of the drawing, that water flowing through the screen 27 will be filtered to remove blades of grass or pieces of rust or other material which would tend to clog the comparatively fine jets of the secondary nozzles 32 and 33. The impact of the water through the main jet continuously cleans the screen 27 while the latter is rotating so that the blades of grass or other material trapped by the screen are ejected through the large jet 12 of the horizontal branch 10.

The jets for the main nozzle may take various forms. For example, the one shown in Figure 2 of the drawing has its aperture cylindrical throughout. The form of jet shown in Figures 3 and 4 illustrates a modified form of jet adapted to be substituted for the jet 12. In this modified form, the jet 46 has its reduced and externally screwthreaded end 47 provided with an eccentrically arranged counter sink 48. Another modified form of jet which may be substituted for the jet 12 is shown in Figures 5 and 6 of the drawing. In this modification, the jet 49 has a screwthreaded end 50 adapted for engagement with the screwthreads at the upturned end 11 of the main nozzle. The screwthreaded end of the jet 49 is provided with a countersink coaxial with the axis of the jet 49. In this case, the inclined wall of the countersink is provided with spirally arranged grooves 51.

The sprinkler described is intended primarily for use in orange groves, and ordinarily would have to be placed some 20 feet above the ground. The purpose of the eccentric counterbore, in the form of jet shown in Figures 3 and 4, is to break up the water stream through the main nozzle just enough to give an even coverage without materially diminishing the area irrigated. It has also the advantage of allowing a free opening for grass or bits of rust and other foreign matter to pass through. Inasmuch as the water stream emerging from this type of jet does not start to break up until some distance from the end of the jet, it is comparatively easy for the operator to see by a break near the end of the jet whether or not there is a partial stoppage.

The spiral fluted counterbore type of jet illustrated in Figures 5 and 6 is used to break up the stream in cases where large drops of water are objectionable. The coverage with this form of jet, however, is somewhat reduced.

It is thought that the invention and numerous of its attendant advantages will be understood from the foregoing description and it is obvious that numerous changes may be made in the form, construction and arrangement of the several parts without departing from the spirit or scope of my invention, or sacrificing any of its attendant advantages; the form herein described being a preferred embodiment for the purpose of illustrating my invention.

What I claim is:

1. An irrigation sprinkler comprising: a substantially vertical supporting pipe adapted to be connected to a supply of liquid under pressure, a horizontally arranged main nozzle rotatable on said pipe about the axis thereof, a reaction nozzle rotatable on and communicating with the interior of the main nozzle, means operable by the rotation of the reaction nozzle for rotating the main nozzle on said pipe, and a screen rotatable with the reaction nozzle and in the passageway through the main nozzle.

2. An irrigation sprinkler comprising a substantially vertical pipe adapted to be connected to a source of liquid under pressure, a main nozzle rotatable on said pipe and having a part extending substantially horizontally therefrom, a cage rotatably mounted in the passageway of said part, a screen secured to said cage, a reaction nozzle, a pipe connecting said reaction nozzle to said cage, and gearing carried by said pipe and main nozzle and operated by the rotation of said cage to rotate the main nozzle around said pipe.

3. An irrigation sprinkler comprising: a substantially vertical supporting pipe adapted to be connected to a supply of liquid under pressure, a horizontally arranged main nozzle rotatable on said pipe, a reaction nozzle rotatable on the main nozzle, a screen connected to and rotatable with said reaction nozzle and extending across the passageway in the main nozzle and means operable by the rotation of the reaction nozzle to rotate the main nozzle around said pipe.

4. An irrigation sprinkler including a substantially vertical pipe adapted to be connected to a supply of liquid under pressure, a sleeve secured thereto, a main nozzle having parts arranged substantially at right angles to each other, one of said parts being mounted to rotate in said sleeve, a cage rotatable in the other part of said nozzle, a screen surrounding said cage and fixed to said cage, a reaction nozzle, means for fixing the reaction nozzle to said cage, and gearing supported by said main nozzle and the sleeve and operable by rotation of said cage to cause rotation of the main nozzle relative to said sleeve.

5. An irrigation sprinkler including a substantially vertical supporting pipe adapted to be connected to a supply of liquid under pressure, a horizontally arranged main nozzle rotatable on said pipe, a reaction nozzle rotatable on said main nozzle, means connected to said reaction nozzle and rotatable in said main nozzle for filtering liquid passing therethrough to the reaction nozzle and means operable by the rotation of the reaction nozzle to rotate the main nozzle around said pipe.

6. An irrigation sprinkler including a substantially vertical supporting pipe adapted to be connected to a supply of liquid under pressure, a horizontally arranged main nozzle rotatable on said pipe, a reaction nozzle rotatable on said main nozzle, a screen connected to said reaction nozzle and rotatable in said main nozzle by the rotation of the reaction nozzle for filtering liquid passing from the main nozzle to and through the reaction nozzle and means operable by the rotation of the reaction nozzle to rotate the main nozzle around said pipe.

CHESTER C. STRAWN.